(12) United States Patent
Mengad et al.

(10) Patent No.: US 10,409,307 B2
(45) Date of Patent: Sep. 10, 2019

(54) METHOD AND APPARATUS FOR DC-DC CONVERTER WITH BOOST/LOW DROPOUT (LDO) MODE CONTROL

(71) Applicant: Dialog Semiconductor GmbH, Kircheim/Teck-Nabern (GB)

(72) Inventors: Zakaria Mengad, Edinburgh (GB); Mykhaylo Teplechuk, Edinburgh (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 15/882,408

(22) Filed: Jan. 29, 2018

(65) Prior Publication Data

US 2018/0150091 A1 May 31, 2018

Related U.S. Application Data

(62) Division of application No. 14/147,667, filed on Jan. 6, 2014, now Pat. No. 9,880,573.

(30) Foreign Application Priority Data

Dec. 6, 2013 (EP) .................................... 13368042
Dec. 20, 2013 (EP) .................................... 13368044

(51) Int. Cl.
*G05F 1/575* (2006.01)
*G05F 1/56* (2006.01)
(Continued)

(52) U.S. Cl.
CPC ................ *G05F 1/56* (2013.01); *G05F 1/575* (2013.01); *H02M 3/158* (2013.01); *G05F 1/59* (2013.01);
(Continued)

(58) Field of Classification Search
CPC ............ G05F 1/59; G05F 1/575; G05F 1/618
See application file for complete search history.

(56) References Cited

U.S. PATENT DOCUMENTS 4,607,323 A     8/1986   Sokal et al.
5,760,647 A *   6/1998   Miller ................. H03F 3/45089
                                                                           330/252

(Continued)

FOREIGN PATENT DOCUMENTS

EP    1 635 239      3/2006
EP    2 551 743      1/2013

OTHER PUBLICATIONS

"Combination Method of DC-DC Converter and LDO to Improve Efficiency and Load Regulation," by Z. H. Shen et al., Electronics Letters, vol. 47, No. 10, May 12, 2011, 2 pgs.

(Continued)

*Primary Examiner* — Fred E Finch, III
*Assistant Examiner* — Rafael O. De Leon Domenech
(74) *Attorney, Agent, or Firm* — Saile Ackerman LLC; Stephen B. Ackerman

(57) ABSTRACT

A low dropout (LDO) device with improved linear mode comprising an error amplifier, a programmable attenuation factor circuit coupled to said error amplifier, a feedback network whose input is electrically connected to said programmable attenuation factor circuit and whose output is electrically coupled to the negative input of said error amplifier, a high side (HS) pre-drive circuit whose input is a high impedance (HiZ) mode signal, a low side (LS) pre-drive circuit whose input is a low pull-down input mode signal, a high side (HS) output stage element electrically coupled to said high side (HS) pre-drive circuit, a low side (LS) output stage element electrically coupled to said low side (LS) pre-drive circuit, and a high side sense (HSENSE) output stage element whose gate is electrically coupled to (Continued)

said high side (HS) pre-drive circuit, and whose gate and source are electrically connected to the output of said error amplifier.

6 Claims, 12 Drawing Sheets

(51) Int. Cl.
*H02M 3/158* (2006.01)
*G05F 1/59* (2006.01)
*G05F 1/618* (2006.01)
*H02M 1/00* (2006.01)

(52) U.S. Cl.
CPC ..... *G05F 1/618* (2013.01); *H02M 2001/0045* (2013.01)

(56) References Cited

U.S. PATENT DOCUMENTS

| | | |
|---|---|---|
| 6,414,856 B1 | 7/2002 | Ambatipudi et al. |
| 6,809,678 B2 | 10/2004 | Vera et al. |
| 7,821,243 B2 | 10/2010 | Shiraishi et al. |
| 8,049,479 B2 | 11/2011 | Shiraishi et al. |
| 2004/0178777 A1* | 9/2004 | Bayadroun ........... H02M 3/156 323/274 |
| 2006/0033481 A1 | 2/2006 | Thiele et al. |
| 2007/0296384 A1 | 12/2007 | Dow et al. |
| 2009/0128115 A1 | 5/2009 | Chen et al. |
| 2010/0001347 A1* | 1/2010 | Sugiura ............... H01L 27/0274 257/350 |
| 2010/0052636 A1 | 3/2010 | Takagi et al. |
| 2010/0277142 A1* | 11/2010 | Tan .................. H02M 7/53803 323/268 |
| 2011/0127977 A1 | 6/2011 | Chang et al. |
| 2014/0049238 A1* | 2/2014 | Hu ......................... G01R 19/00 323/282 |

OTHER PUBLICATIONS

"A High Stability DC-DC Boost Converter with Ripple Current Control and Capacitor-Free LDOs for AMOLED Display," by Se-Won Wang et al., IEEE Asian Solid-State Circuits Conference, Nov. 14-16, 2011, Jeju, Korea, pp. 41-44.

"An 80% Peak Efficiency, 0.84m W Sleep Power Consumption, Fully-Integrated DC-DC Converter with Buck/LDO Mode Control," by Xiaohan Gong et al., IEEE, Sep. 19, 2011, 4 pgs.

"Implications of Proximity Effects for Analog Design," by P.G. Drennan, et al, IEEE 2006 Custom Intergrated Circuits Conference (Cicc), Sep. 1, 2006, pp. 169-176.

European Search Report, Application No. 13 368 044.7-1807, Applicant: Dialog Semiconductor GmbH, dated Aug. 29, 2014, 12 pgs.

European Search Report, Application No. 13 368 009.0-1807, Applicant: Dialog Semiconductor GmbH, dated Jul. 22, 2015, 5 pgs.

\* cited by examiner

METHOD AND APPARATUS FOR DC-DC CONVERTER WITH BOOST/LOW DROPOUT (LDO) MODE CONTROL

This is a divisional application of U.S. patent application Ser. No. 14/147,667 filed on Jan. 6, 2014, which is herein incorporated by reference in its entirety, and assigned to a common assignee.

BACKGROUND

Field

The disclosure relates generally to power supply circuits and methods and, more particularly, to inductive boost type converters, circuit and a method thereof.

Description of the Related Art

Low dropout (LDO) regulators are a type of voltage regulators used in conjunction with semiconductor devices, integrated circuit (IC), battery chargers, and other applications. Low dropout regulators (LDO) can be used in digital, analog, and power applications to deliver a regulated supply voltage.

In an example known to the inventor, a low dropout (LDO) regulator output stage is shown in FIG. 1. FIG. 1 illustrates a typical implementation of a boost DC/DC output stage supplying a load in the form of a Class D speaker amplifier. The circuit comprises a battery source input voltage VIN=VBATTERY 10, a ground reference 20, and output voltage VOUT=VBOOST 30. The output load consists of a Class D amplifier 40, and capacitor 60. The input voltage signal has a series inductor 50 which is electrically connected at node LX 55 to the p-channel MOSFET output pull-up transistor drain 70 and to the n-channel MOSFET output pull-down transistor drain 80. The high side (HS) p-channel MOSFET pull-up output stage is connected to the high side (HS) driver 75 (e.g. also noted as a "pre-driver"). The input of the high side (HS) driver (pre-driver) 75 is electrically connected to the input signal PWM (P) 77. The high side (HS) p-channel MOSFET pull-up output stage is connected to the high side (HS) driver 75. The input of the high side (HS) pre-driver 75 is electrically connected to the input signal PWM (P) 77. The low side (LS) n-channel MOSFET pull-down output stage 80 is connected to the low side (LS) driver 85 (e.g. pre-driver). The input of the low side (LS) pre-driver 85 is electrically connected to the input signal PWM (N) 87.

As illustrated in FIG. 2, a system with both low drop-out (LDO) and boost operation known to the inventor is shown. FIG. 2 shows a input voltage VIN 110, a ground rail 120, an output voltage VOUT 130, a load 140, an inductor 150, a capacitor 160, a low dropout (LDO) function 170, and boost function 180. In conventional implementations and when a linear mode is needed an extra power device is added between the battery (e.g. VIN) and the output voltage VOUT. A power device, referred to as high side (HS) is put in an "off-state" in order for the extra power device to drive the load and output voltage (VOUT) in a linear mode.

In this implementation, the usage of a low dropout (LDO) and boost mode device requires additional silicon area and semiconductor chip size. Additionally, the need for extra circuitry leads to unwanted conduction during switching modes. It would be desirable to eliminate the need for an extra power device to achieve the same functional objective. It would also be desirable to simplify the network to avoid additional circuitry and achieve a linear LDO mode.

In low dropout (LDO) regulators, a DC-DC converter having a low side pre-driver has been discussed. As discussed in published U.S. Pat. No. 8,049,479 to Shiraishi et al, a DC/DC converter package having separate logic and power ground terminal is described where a DC-DC converter having a low side pre-driver driving a low side MOSFET, and a portion for a main circuit passing through a high side is disclosed.

In low dropout regulators, a DC-to-DC converter having a low side pre-driver driving a low side MOSFET, and a portion for a main circuit passing through a high side has been discussed. As discussed in published U.S. Pat. No. 7,821,243 to Shiraishi et al, a DC-DC converter having a low side pre-driver driving a low side MOSFET, and a portion for a main circuit passing through a high side is shown. The implementation also uses a PWM, VGL pre-drive, and VGH pre-drive.

In low dropout (LDO) regulators, control methods exist for plurality of DC-DC converters. As discussed in published U.S. Pat. No. 6,809,678 to Vera et al, shows a plurality of DC-to-DC converters each contains a power section controller calibration to provide matching of control parameters. Data processing controlled DC-to-DC converter system and method of operation are highlighted.

Methods and apparatus for multiple converters has been shown. As discussed in published U.S. Pat. No. 6,414,856 to Ambatipudi et al. describes a high precision output voltage matching in a multiple output power converter.

Matching is further highlighted in power converters. As discussed in published U.S. Pat. No. 4,607,323 to Sokal et al shows a power converter with a matching network between the output of Class E dc/dc inverter and input of rectifiers. Class E high frequency high efficiency dc/dc power converter are discussed.

In these embodiments, the solutions to improve the response of the low dropout (LDO) regulator, and more specifically DC-to-DC converters utilize various means to address matching.

SUMMARY

It is desirable to provide a solution to eliminate the need for an additional power device to the switching high side power device to save silicon area in a DC-to-DC converter.

It is desirable to provide a solution to eliminate the need for additional circuitry to prevent unwanted conduction during switching mode in a DC-to-DC converter A principal object of the present disclosure is to take advantage of the high side switching device as the main driving device in the linear mode.

Another further object of the present disclosure is to provide a solution for linear low dropout (LDO) that can be started in regulation, or bypass mode of operations.

In accordance with the objects of this disclosure, a low dropout (LDO) device with removal of standard high side switching device as the main driver of the linear mode operation, simplifying the embodiment and saving silicon area.

Also in accordance with the object of this disclosure, a low dropout (LDO) device with improved matching characteristics is disclosed.

Also in accordance with the objects of this disclosure, a low dropout (LDO) device is provided that avoids the need for extra circuitry that prevents unwanted conduction.

The above and other objects are achieved by a low dropout (LDO) device with the inclusion of an active device matched with the main active device of any boost type DC-to-DC regulator, where the additional matched device introduces both addition and arrangement, as well as provides usage to regulate the linear mode.

The above and other objects are also achieved by a low dropout (LDO) device with improved linear mode comprising an error amplifier, a programmable attenuation factor circuit coupled to the error amplifier, a feedback network whose input is electrically connected to the programmable attenuation factor circuit and whose output is electrically coupled to the negative input of the error amplifier, a high side (HS) pre-drive circuit whose input is a high impedance (HiZ) mode signal, a low side (LS) pre-drive circuit whose input is a low pull-down input mode signal, a high side (HS) output stage element electrically coupled to the high side (HS) pre-drive circuit, a low side (LS) output stage element electrically coupled to the low side (LS) pre-drive circuit, and a high side sense (HSENSE) output stage element whose gate is electrically coupled to the high side (HS) pre-drive circuit, and whose gate and source are electrically connected to the output of the error amplifier.

The above and other objects are also achieved by a low dropout (LDO) device with improved linear mode operation comprising an error amplifier, a programmable attenuation factor circuit coupled to the error amplifier, a feedback network whose input is electrically connected to the programmable attenuation factor circuit and whose output is electrically coupled to the negative input of the error amplifier, a high side (HS) pre-drive circuit whose input is a high impedance (HiZ) mode signal, a low side (LS) pre-drive circuit whose input is a low pull-down input mode signal, a high side (HS) output stage element which is an n-channel MOSFET device electrically coupled to the high side (HS) pre-drive circuit, a low side (LS) output stage element which is an n-channel MOSFET device electrically coupled to the low side (LS) pre-drive circuit, and a high side sense (HSENSE) output stage element which is an n-channel MOSFET device whose gate is electrically coupled to the high side (HS) pre-drive circuit, and whose gate is electrically connected to the output of the error amplifier.

The above and other objects are also achieved by a low dropout (LDO) device is discussed comprising an error amplifier, a programmable attenuation factor circuit coupled to the error amplifier, a feedback network whose input is electrically connected to the programmable attenuation factor circuit and whose output is electrically coupled to the negative input of the error amplifier, a low side (LS) MOSFET element whose input is the error amplifier, a high side (HSENSE) MOSFET element whose gate is electrically coupled to the slow side (LS) MOSFET, a high side (HS) element which is a MOSFET device whose gate and well are electrically coupled to the high side (HSENSE) device.

The above and other objects are also achieved by a low dropout (LDO) circuit comprising of an error amplifier, a programmable attenuation factor circuit coupled to the error amplifier, a feedback network whose input is electrically connected to said programmable attenuation factor circuit and whose output is electrically coupled to the negative input of the error amplifier, a first low side (LS) MOSFET element whose input is the error amplifier, a second low side (LS) MOSFET element whose gate is electrically connected to the first low side (LS) MOSFET, a current mirror network electrically coupled to the drain of first low side (LS) MOSFET element and to the drain of said second low side (LS) MOSFET element, a high side (HSENSE) MOSFET element whose gate is electrically coupled to said first low side (LS) MOSFET and whose drain is electrically coupled to the current mirror network, and, a high side (HS) element which is a MOSFET device whose gate and well are electrically coupled to the high side (HSENSE) device and whose well and drain are electrically coupled to the current mirror.

The above and other objects are also achieved by a methodology for providing improved operation of a low dropout (LDO) in linear mode of operation in accordance with the embodiment of this disclosure. A method of a improved linearity comprising of the steps of (1) providing a low dropout (LDO) regulator comprising of a low side (LS) pre-driver circuit, a low side (LS) output driver circuit, a high side (HS) pre-driver circuit, a high side (HS) output driver circuit, and a feedback loop error amplifier, (2) providing a high side sense (HSENSE) circuit, (3) matching said high side (HS) output driver circuit design layout and the high side sense (HSENSE) circuit design layout, (4) feeding the output signal to said feedback loop error amplifier, (5) feeding said feedback loop error amplifier output signal to said a high side sense (HSENSE) circuit, (6) and regulate the output voltage in linear mode.

As such, a novel low dropout (LDO) device with improved linear operation mode is desired. Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which.

DETAILED DESCRIPTION

Figure 1:
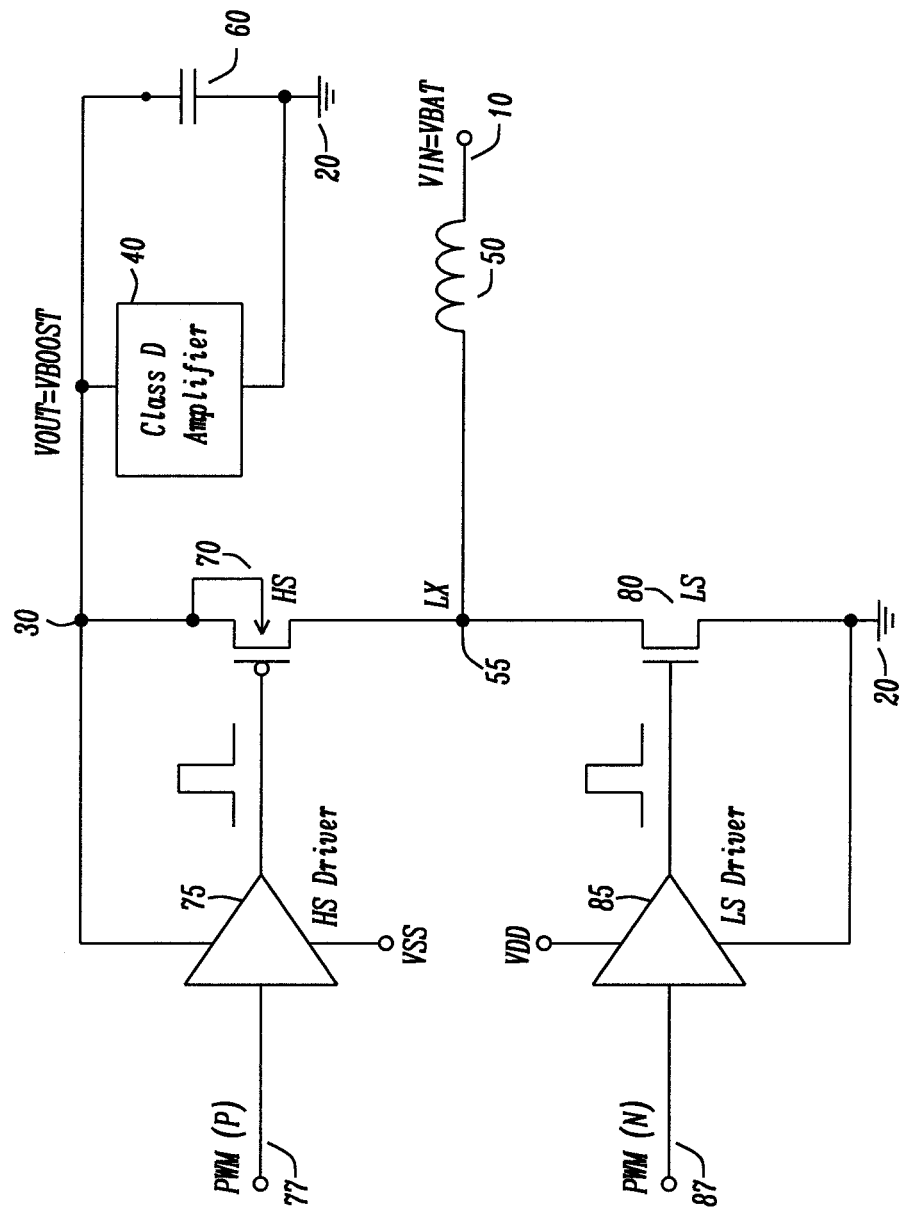
FIG. 1 is a circuit schematic diagram illustrating an embodiment known to the inventor of a boost DC/DC output stage and load.

FIG. 1 is a circuit schematic diagram illustrating an embodiment known to the inventor of a boost DC/DC output stage and load. FIG. 1 illustrates a typical implementation of a boost DC/DC output stage supplying a load in the form of a Class D speaker amplifier. The circuit comprises a battery source input voltage VIN=VBATTERY 10, a ground reference 20, and output voltage VOUT=VBOOST 30. The output load consists of a Class D amplifier 40, and capacitor 60. The input voltage signal has a series inductor 50 which is electrically connected at node LX 55 to the p-channel MOSFET output pull-up transistor drain 70 and to the n-channel MOSFET output pull-down transistor drain 80. The high side (HS) p-channel MOSFET pull-up output stage is connected to the high side (HS) driver (e.g. pre-driver) 75. The input of the high side (HS) driver (e.g. pre-driver) 75 is electrically connected to the input signal PWM (P) 77. The high side (HS) p-channel MOSFET pull-up output stage is connected to the high side (HS) driver 75. The input of the high side (HS) driver (e.g. pre-driver) 75 is electrically connected to the input signal PWM (P) 77. The low side (LS) n-channel MOSFET pull-down output stage 80 is connected to the low side (LS) driver (e.g. pre-driver) 85. The input of the low side (LS) driver (e.g. pre-driver) 85 is electrically connected to the input signal PWM (N) 87.

Figure 2:
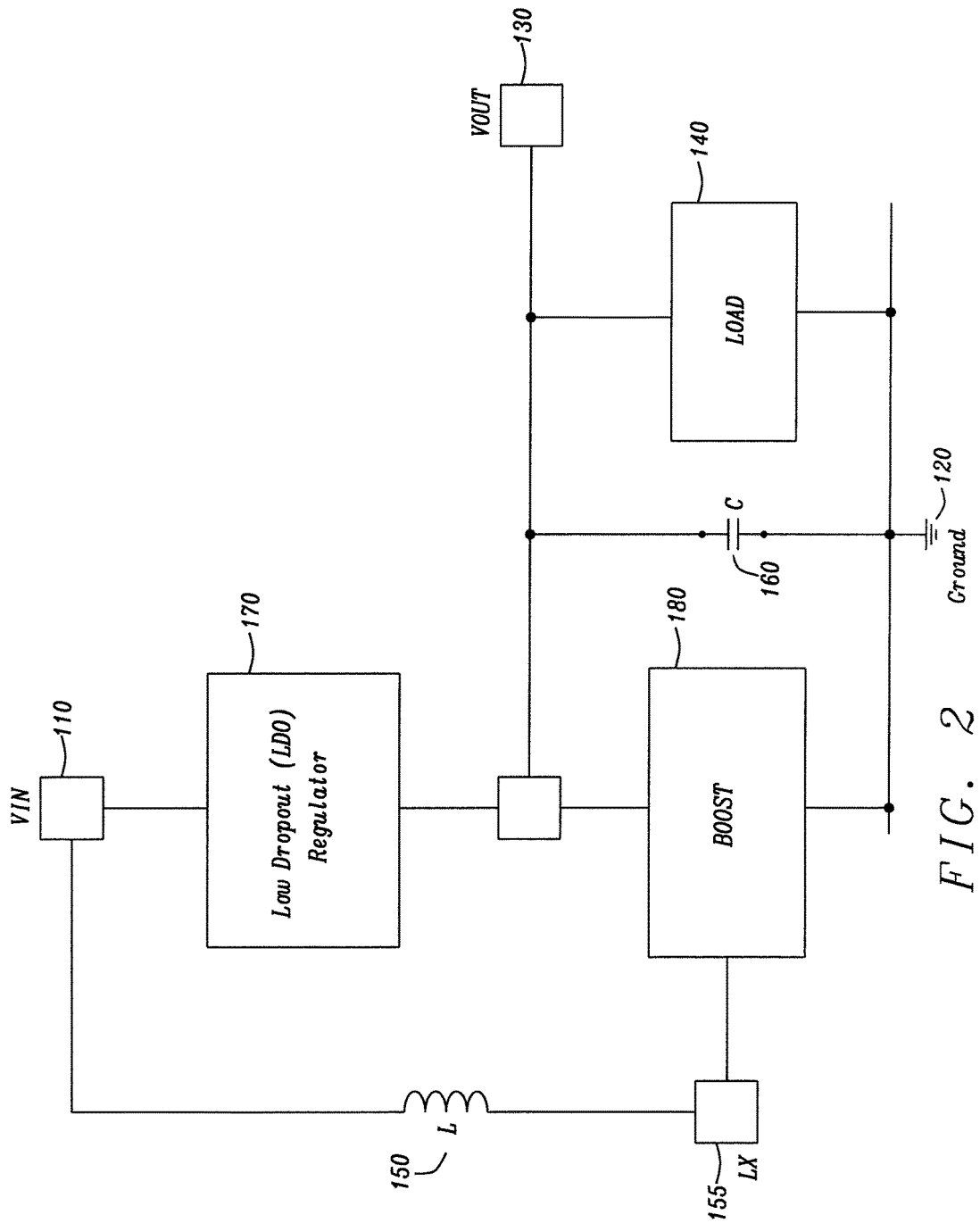
FIG. 2 is a circuit schematic diagram illustrating an embodiment known to the inventor of a system with both low drop-out (LDO) and boost operation.

FIG. 2 is a circuit schematic diagram illustrating an embodiment known to the inventor of a system with both low drop-out (LDO) and boost operation. FIG. 2 shows a input voltage VIN 110, a ground rail 120, an output voltage VOUT 130, a load 140, an inductor 150, a capacitor 160, a low dropout (LDO) function 170, and boost function 180. In conventional implementations and when a linear mode is needed an extra power device is added between the battery (e.g. VIN) and the output voltage VOUT. A power device, referred to as high side (HS) is put in an "off-state" in order for the extra power device to drive the load and output voltage (VOUT) in a linear mode. In this implementation, the usage of a low dropout (LDO) and boost mode devices requires additional silicon area and semiconductor chip size; this increases the cost per device. It is not desirable to have an additional device to address the LDO and boost operation. Additionally, the need for extra circuitry leads to unwanted conduction during switching modes. It would be desirable to eliminate the need for an extra power device to achieve the same functional objective, as will be discussed in the next section.

Figure 3:
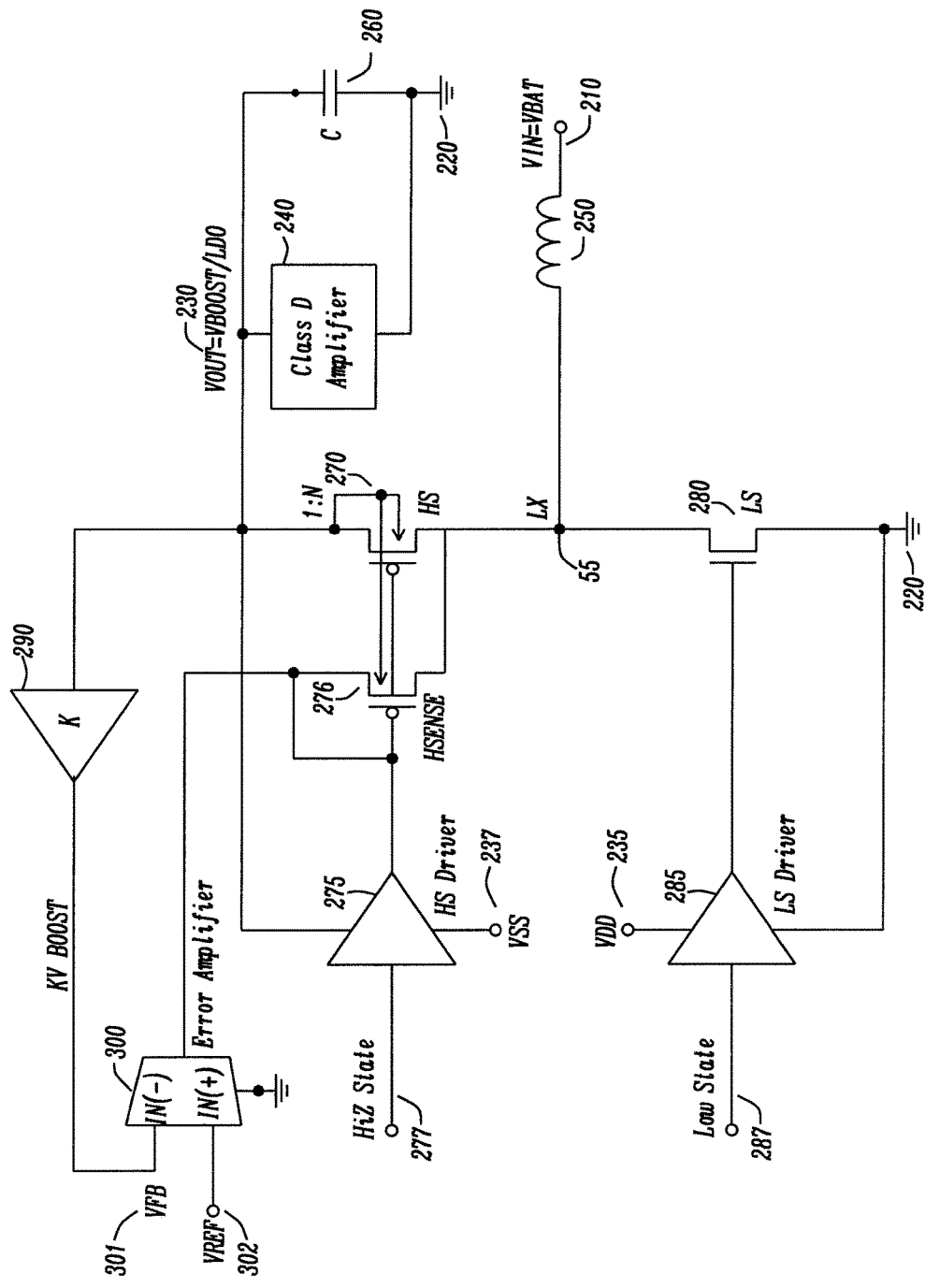
FIG. 3 is a circuit schematic diagram illustrating a circuit schematic in accordance with an embodiment of the disclosure.

FIG. 3 is a circuit schematic diagram illustrating a circuit schematic in accordance with an embodiment of the disclosure. FIG. 3 illustrates a typical implementation of a boost DC/DC output stage supplying a load with inclusion of a high side sense (HSENSE) device. The circuit comprises a battery source input voltage VIN=VBATTERY 210, a ground reference 220, and output voltage VOUT=VBOOST 230. The output load consists of a Class D amplifier 40, and capacitor 60. The input voltage signal has a series inductor 250 which is electrically connected at node LX 255 to the p-channel MOSFET output pull-up transistor drain 270 and to the n-channel MOSFET output pull-down transistor drain 280. The high side (HS) p-channel MOSFET pull-up output stage 270 is connected to the high side (HS) driver (e.g. pre-driver) 275. The input of the high side (HS) driver (e.g. pre-driver) 275 is electrically connected to the input signal PWM (P) 277. The high side (HS) p-channel MOSFET pull-up output stage 270 is connected to the high side (HS) driver (e.g. pre-driver) 275. The input of the high side (HS) driver (e.g. pre-driver) 275 is electrically connected to the input signal PWM (P) 277. The low side (LS) n-channel MOSFET pull-down output stage 280 is connected to the low side (LS) (e.g. pre-driver) driver 285. The input of the low side (LS) driver (e.g. pre-driver) 285 is electrically connected to the input signal PWM (N) 287. A feedback loop is connected to the output voltage VOUT 230 to an network of programmable attenuation factor K, 290. The feedback signal line voltage is raised to voltage magnitude KVBOOST; this signal continues to the negative input of error amplifier 300. The negative input to the error amplifier 300 is the negative terminal 301. The positive input terminal to the error amplifier 300 is the positive terminal, electrically connected to V=VREF 302, where VREF is a reference voltage. The ground connection of error amplifier 300 is ground reference GND 220. The regulated output voltage is then equal to approximately VOUT=VREF/K, where K is the programmable attenuation factor.

An active MOSFET device 276 is added to the pull-up MOSFET 270. The active device, p-channel MOSFET HSENSE 276, has its MOSFET gate in parallel with the p-channel MOSFET gate of HS 270. The p-channel MOSFET HS 270 has a multiplicity of fingers, where the ratio of fingers from the MOSFET HSENSE 276 to the number of fingers of MOSFET HS 270 is 1 to N, denoted as 1:N. The p-channel MOSFET HSENSE 276 source and gate is coupled to the signal line from error amplifier 300, whose drain is connected to the drain of the p-channel MOSFET 270.

The HS Driver (pre-driver) 275 is placed in a HIZ state. The placement of the Driver (e.g. pre-driver) in the high impedance state (HIZ) state is important to the operability of the embodiment. The LS Driver (e.g. pre-driver) 285 is placed in a pull-down state.

An objective of this embodiment is to regulate the output voltage in a linear mode of operation. When the differential voltage between the input voltage and the output voltage (e.g. VIN-VOUT) is small (e.g. in the range of 100 mV), the regulator is in a low dropout (LDO) mode of operation. This embodiment shows a means of controlling an existing switching power device HS 270 and providing usage as a main power device in low dropout (LDO) mode (Non PWM) wherein the HSENSE device 276 is in a diode-connected configuration where the source is swapped with the drain and the gate-to-drain voltage (VGD) replaces the gate-to-source voltage (VGS) to drive the MOSFET gate of the power device HS 270.

In this embodiment, an essential feature is that the p-channel MOSFET HSENSE 276 is matched to the p-channel MOSFET HS 270. Device matching is important in the linear mode of operation. Device matching is a function of both local and global device variation due to photo-lithography, etching, topography, and orientation differences. In MOSFETs, this influences channel length control. Channel length control can be divided into chip mean line width variation and across chip linewidth variation (ACLV). ACLV is a function of local lithographic and gate conductor etch variation in multi-finger MOSFET design layout which influences the MOSFET gate finger matching. The spacing and pitch between adjacent MOSFET gate fingers influence the matching of line width structures impacting device linearity. In semiconductors, a "nested line" can have different dimensional characteristics compared to an "isolated line." A nested line is a line in a multi-finger MOSFET which forms an array of lines. An isolated line is a single line (e.g. one finger MOSFET). The pitch (e.g. line width and gate-to-gate space) is influenced by the photo and etch processes, in both the line width, as well as the sidewall slope of the transistor. To provide optimum matching of all lines, additional lines are used on the edges of a MOSFET, referred to as "dummy lines." To provide optimum matching between the p-channel MOSFET HSENSE 276 and p-channel MOSFET HS 270 placement of the MOSFETs, using identical design layout or design layout of adjacent, integrated, or within a close proximity, and use of dummy line widths can achieve the best matching characteristics. Photolithographic lens distortion also influences device matching; hence, orientation also plays a role in the device matching characteristics. To provide optimum matching to minimize the impact of orientation, between the p-channel MOSFET HSENSE 276 and p-channel MOSFET HS 270 placement of the MOSFETs, using identical design layout and identical orientation can achieve the best results.

The HS device 270 is large, and typically a multi-finger power device, where the number of fingers is large. The MOSFET device HSENSE 276 is N times smaller than the HS device 270. Hence, the MOSFET device HSENSE 276 can be inserted into the array of MOSFET fingers of HS 270, allowing for optimum matching. The MOSFET device HSENSE 276 can be inserted into the array of MOSFET fingers of HS 270 with a different MOSFET source connection.

To provide further optimum matching of the p-channel HS device 270 and the p-channel MOSFET device HSENSE 276, the two devices can be placed in the same n-well. Placement of the two devices into a common well (or tub) provides matching of the n-well-to-substrate capacitance, as well as the parasitic substrate resistance. In addition, the closest proximity is achievable with the placement of both elements into a common well (or tub) structure.

Figure 12:
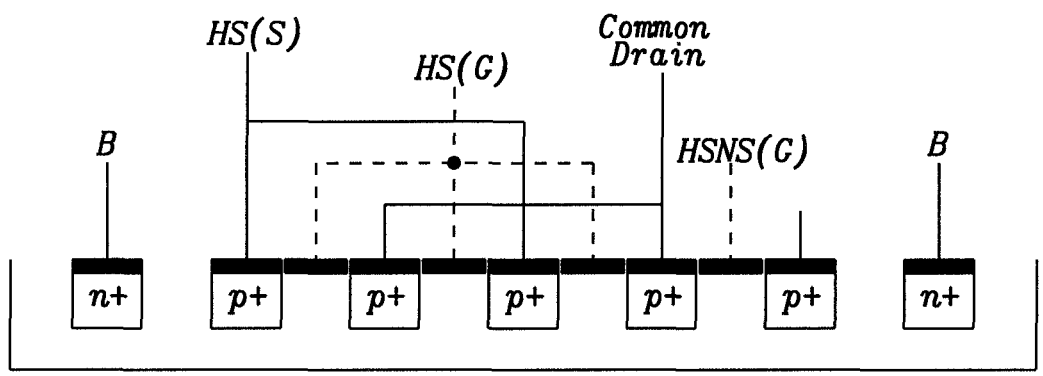
FIG. 12 shows an example of how identical design layout and identical orientation for both high side sense output stage element and high side output stage element has been implemented.

FIG. 12 shows an example of how identical design layout and identical orientation for both high side sense output stage element (276) and high side output stage element (270) have been implemented. The example of FIG. 12 shows the number of fingers N=3, a common drain and the high side sense output stage element and the high side output stage element sharing the same well (B), which improves matching by reducing the space between both output stage elements.

Figure 13:
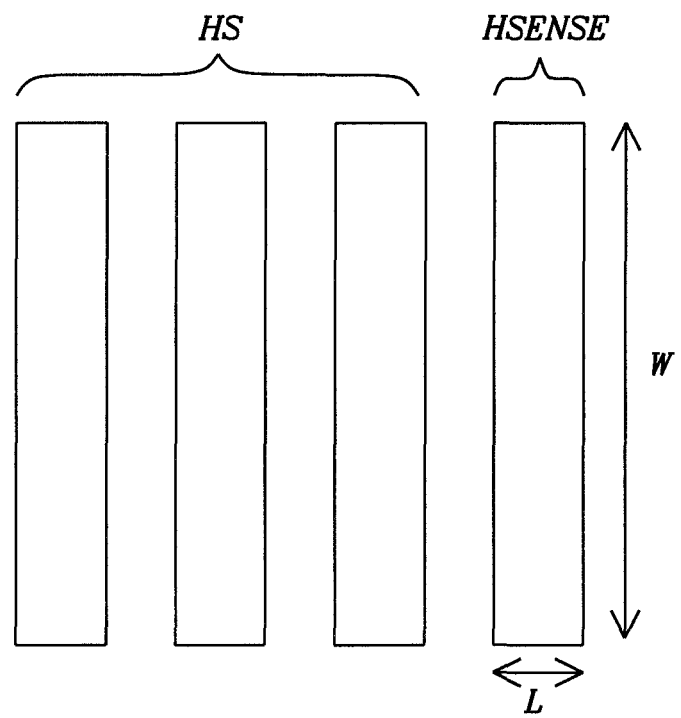
FIG. 13 illustrates that both high side sense (HSENSE) output stage element and high side (HS) output stage element share the same width (W) and the same length (L).

FIG. 13 illustrates the identical layout design of the MOSFET fingers of the high side sense (HSENSE) output stage element and of the high side (HS) output stage element, which improves matching of both output stage elements. As shown in FIG. 13 both high side sense (HSENSE) output stage element and high side (HS) output stage element share the same width (W) and the same length (L).

In applications where the boost converter is used to supply a switching speaker amplifier, this methodology can be used to provide improved power supply rejection ratio (PSSR) for the speaker amplifier in low audio signal conditions.

The implementation shown is a p-channel MOSFET-based implementation. The implementation is not limited to p-channel MOSFETs but can be also applied to an equivalent implementation utilizing n-channel MOSFET and other devices. Also note that the implementation is applicable to advanced technologies that utilize FinFET devices. In addition, this concept is also applicable to bipolar junction transistors (BJT), hetero junction bipolar transistors (HBT), LDMOS transistors, as well as BiCMOS technology, LDMOS technology, and BCD technology.

Figure 4:
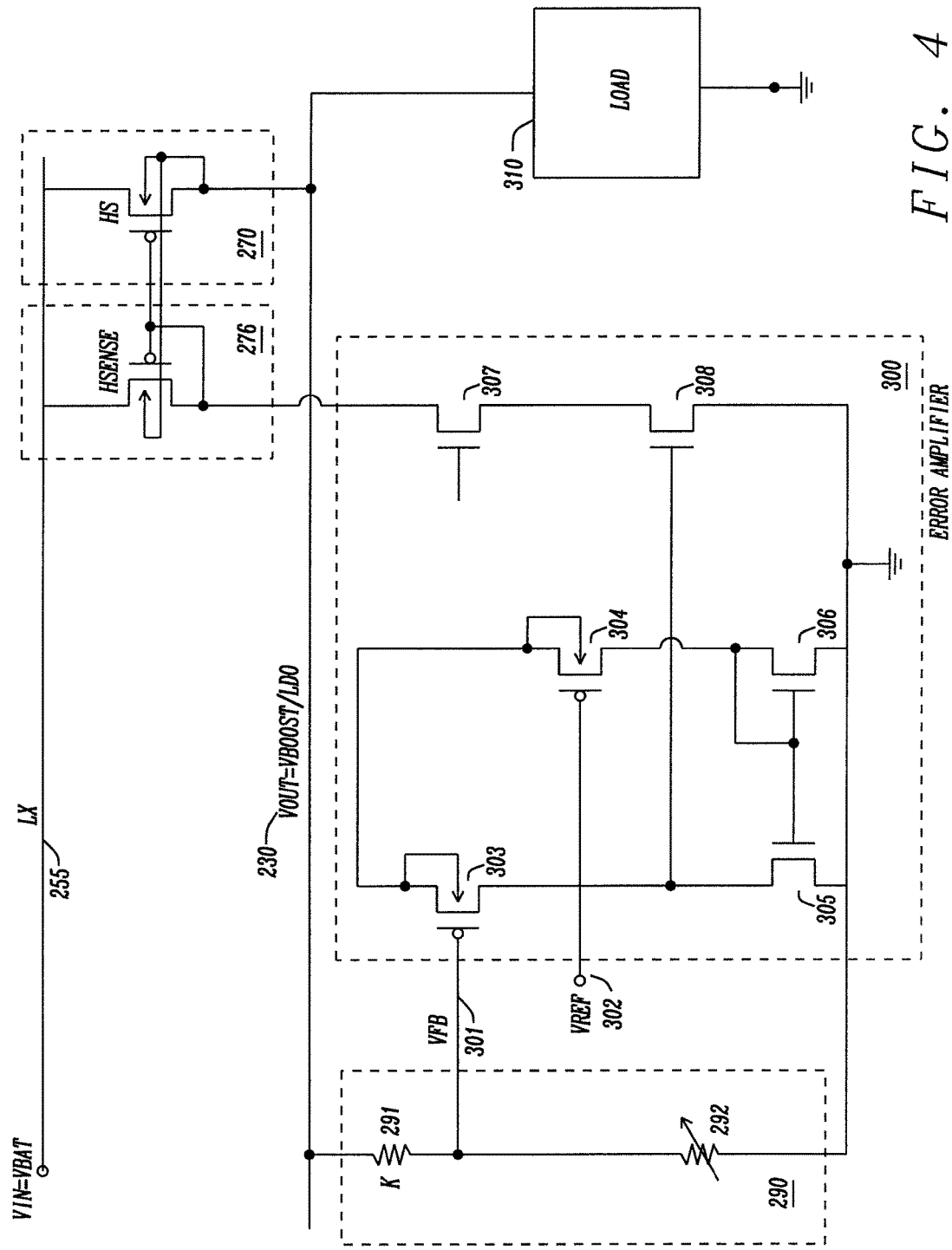
FIG. 4 a circuit schematic diagram illustrating an error amplifier with the HSENSE and HS devices in accordance with one embodiment of the disclosure.

FIG. 4 a circuit schematic diagram illustrating an error amplifier with the HSENSE and HS devices in accordance with the embodiment of the disclosure. FIG. 4 shows a circuit schematic of the error amplifier circuit, attenuation factor K circuit, HS circuit element, HSENSE circuit element, and load. The circuit contains the VOUT signal 230, VIN signal 255, HS output stage 270, HSENSE output stage 276, attenuation circuit K 290, and error amplifier circuit 300, and load 310. The HS circuit element 270 is a p-channel MOSFET device whose source is connected to VIN 255 and whose drain is connected to VOUT 230. The HSENSE element 276 is a p-channel MOSFET device whose source is connected to VIN 255 and whose drain and gate are in a diode-configuration connected to the MOSFET drain. The attenuation network K 290 consists of a resistor element 291, and a variable resistor element 292, forming a resistor divider circuit. The center node of the resistor divider network provides the feedback voltage, VFB, to the error amplifier 300. The error amplifier inputs, VFB and VREF are electrically connected to p-channel MOSFET s 303, and 304, respectively, forming a differential receiver network. Within the error amplifier the p-channel MOSFETs are sourced from a current mirror formed using n-channel MOSFETs 305 and 306. The output of the differential receiver network is connected to the MOSFET gate of n-channel MOSFET 308. MOSFET 308 is in a cascode configuration with MOSFET 307. MOSFET 307 is electrically connected to the HSENSE device 276.

Figure 5:
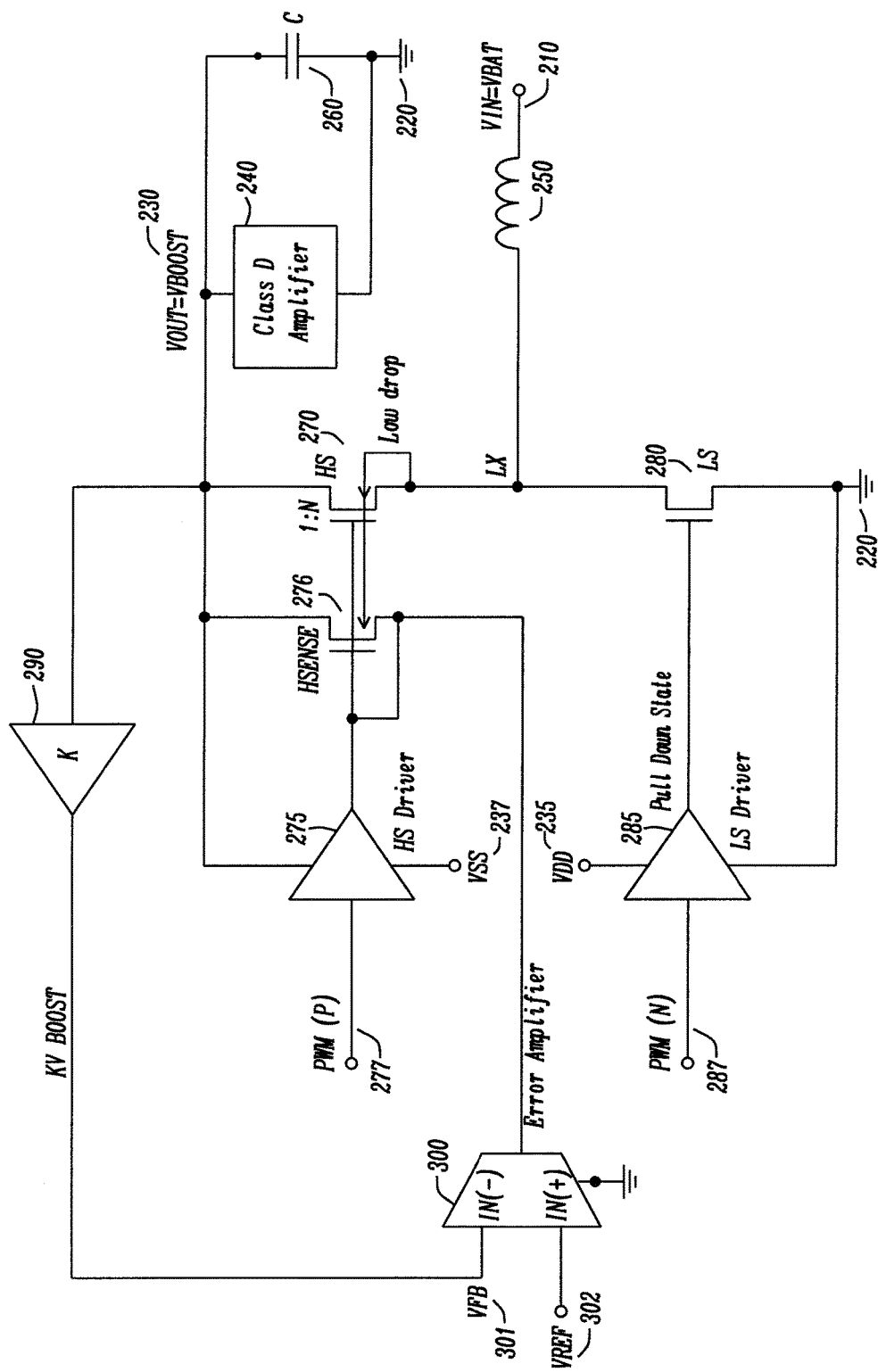
FIG. 5 is a circuit schematic diagram illustrating an error amplifier with the HSENSE and HS devices in accordance with a second embodiment of the disclosure.

FIG. 5 is a circuit schematic diagram illustrating a circuit schematic in accordance with a second embodiment of the disclosure. FIG. 5 illustrates a typical implementation of a boost DC/DC output stage supplying a load with inclusion of a high side sense (HSENSE) device where the HS and HSENSE devices are n-channel transistors. The circuit comprises a battery source input voltage VIN=VBATTERY 210, a ground reference 220, and output voltage VOUT=VBOOST 230. The output load consists of a Class D amplifier 240, and capacitor 260. The input voltage signal has a series inductor 250 which is electrically connected at node LX 255 to the n-channel MOSFET output pull-up transistor drain 270 and to the n-channel MOSFET output pull-down transistor drain 280. The high side (HS) n-channel MOSFET pull-up output stage 270 is connected to the high side (HS) driver (e.g. pre-driver) 275. The input of the high side (HS) driver (e.g. pre-driver) 275 is electrically connected to the input signal PWM (P) 277. The high side (HS) p-channel MOSFET pull-up output stage 270 is connected to the high side (HS) driver (e.g. pre-driver) 275. The input of the high side (HS) driver (e.g. pre-driver) 275 is electrically connected to the input signal PWM (P) 277. The low side (LS) n-channel MOSFET pull-down output stage 280 is connected to the low side (LS) (e.g. pre-driver) driver 285. The input of the low side (LS) driver (e.g. pre-driver) 285 is electrically connected to the input signal PWM (N) 287. A feedback loop is connected to the output voltage VOUT 230 to an network of programmable attenuation factor K, 290. The feedback signal line voltage is raised to voltage magnitude KVBOOST; this signal continues to the negative input of error amplifier 300. The negative input to the error amplifier 300 is the negative terminal 301. The positive input terminal to the error amplifier 300 is the positive terminal, electrically connected to V=VREF 302, where VREF is a reference voltage. The ground connection of error amplifier 300 is ground reference GND 220. The regulated output voltage is then equal to approximately VOUT=VREF/K, where K is the programmable attenuation factor. An active MOSFET device 276 is added to the pull-up MOSFET 270. The n-channel MOSFET HSENSE 276 has its MOSFET gate in parallel with the n-channel MOSFET gate of HS 270. The n-channel MOSFET HS 270 has a multiplicity of 1:N. The n-channel MOSFET HSENSE 276 source and gate is coupled to the signal line from error amplifier 300, and whose drain is connected to the drain of the n-channel MOSFET 270. The HS Driver (pre-driver) 275 is placed in a HIZ state. The placement of the Driver (e.g. pre-driver) in the high impedance state (HIZ) state is important to the operability of the embodiment. The LS Driver (e.g. pre-driver) 285 is placed in a pull-down state. In this embodiment, and essential feature is that the n-channel MOSFET HSENSE 276 is matched to the n-channel MOSFET HS 270. Device matching is important in the linear mode of operation.

Figure 6:
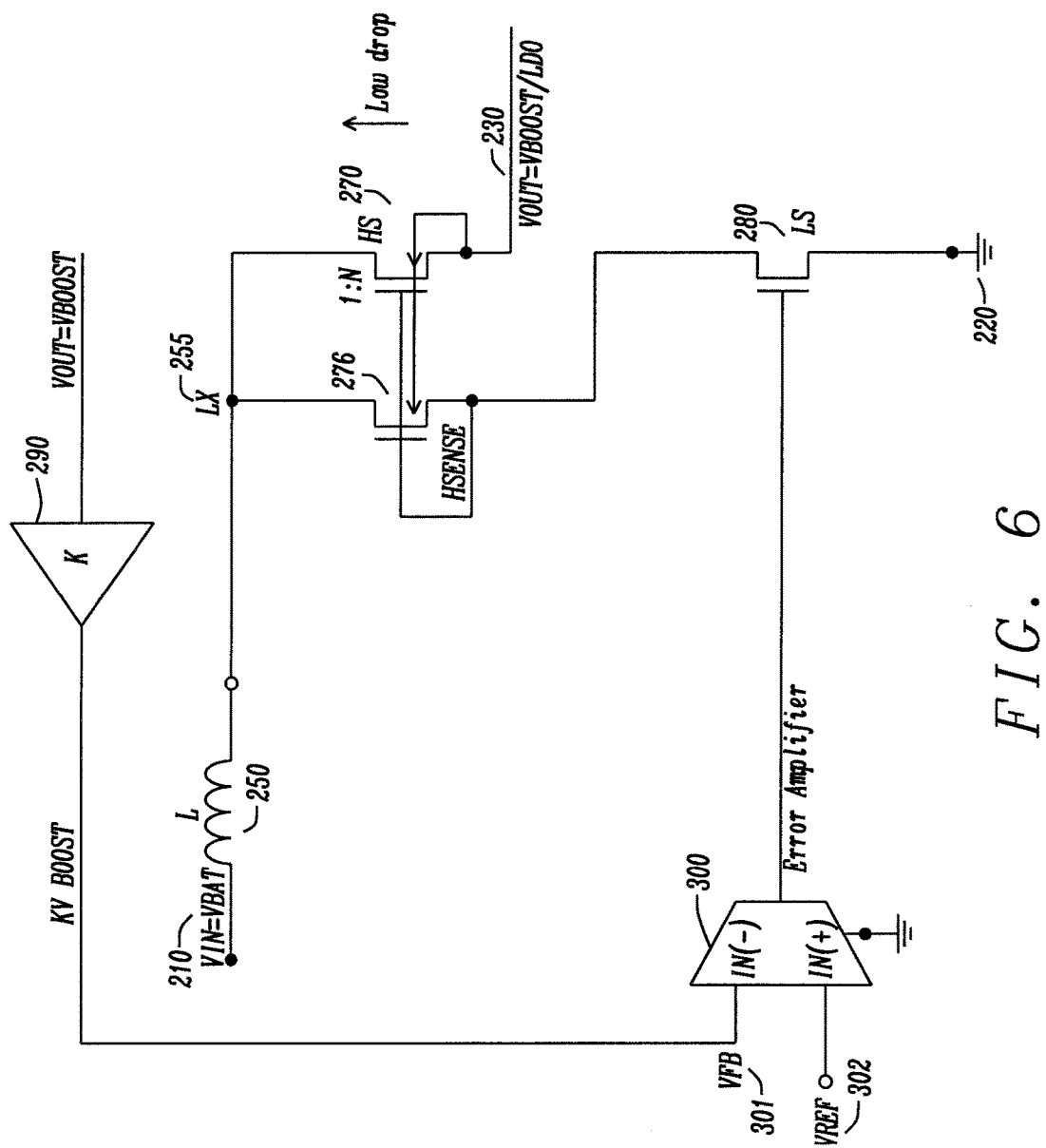
FIG. 6 is a simplified circuit schematic in accordance with a third embodiment of the disclosure.

FIG. 6 is a simplified circuit schematic in accordance with a third embodiment of the disclosure. The circuit comprises of a battery source input voltage VIN=VBATTERY 210, a ground reference 220, and output voltage VOUT=VBOOST 230. The input voltage signal has a series inductor 250 which is electrically connected at node LX 255 to the n-channel MOSFET transistor HS 270. The low side (LS) n-channel MOSFET pull-down output stage 280 is connected to the n-channel MOSFET HSENSE 276. The input of the low side (LS) driver is electrically connected to error amplifier 300. A feedback loop is connected to the output voltage VOUT 230 to an network of programmable attenuation factor K, 290. The feedback signal line voltage is raised to voltage magnitude KVBOOST; this signal continues to the negative input of error amplifier 300. The negative input to the error amplifier 300 is the negative terminal 301. The positive input terminal to the error amplifier 300 is the positive terminal, electrically connected to V=VREF 302, where VREF is a reference voltage. The ground connection of error amplifier 300 is ground reference GND 220. The regulated output voltage is then equal to approximately VOUT=VREF/K, where K is the programmable attenuation factor. An active MOSFET device 276 is added to the pull-up MOSFET 270. The active device, the n-channel MOSFET HSENSE 276, has its MOSFET gate in parallel with the n-channel MOSFET gate of HS 270. The n-channel MOSFET HS 270 has a multiplicity of fingers, where the ratio of the fingers of the MOSFET HSENSE 276 to MOSFET HS 270 is denoted as multiplicity of 1 N. The n-channel MOSFET HSENSE 276 gate is coupled to the LS MOSFET 280. In this embodiment, and essential feature is that the n-channel MOSFET HSENSE 276 is matched to the n-channel MOSFET HS 270.

Figure 7:
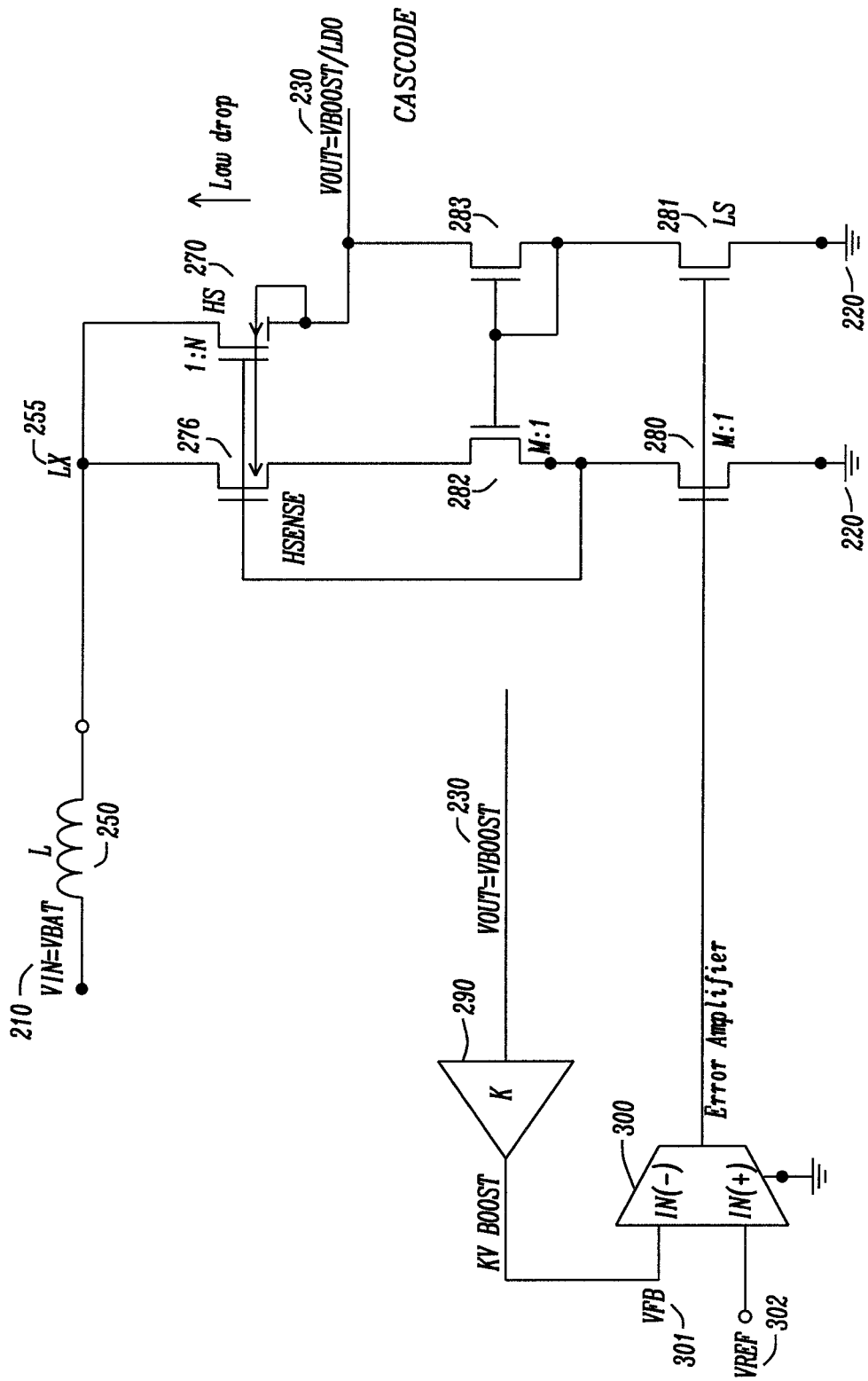
FIG. 7 is simplified circuit schematic with a cascode network in accordance with a fourth embodiment of the disclosure.

FIG. 7 is simplified circuit schematic with a cascode network in accordance with a fourth embodiment of the disclosure. The circuit comprises of a battery source input voltage VIN=VBATTERY 210, a ground reference 220, and output voltage VOUT=VBOOST 230. The input voltage signal has a series inductor 250 which is electrically connected at node LX 255 to the n-channel MOSFET transistor HS 270. The low side (LS) n-channel MOSFET pull-down output stage 280 is connected to the n-channel MOSFET HSENSE 276. The input gate of the low side (LS) driver is electrically connected to error amplifier 300. A feedback loop is connected to the output voltage VOUT 230 to an network of programmable attenuation factor K, 290. The feedback signal line voltage is raised to voltage magnitude KVBOOST; this signal continues to the negative input of error amplifier 300. The negative input to the error amplifier 300 is the negative terminal 301. The positive input terminal to the error amplifier 300 is the positive terminal, electrically connected to V=VREF 302, where VREF is a reference voltage. The ground connection of error amplifier 300 is ground reference GND 220. The regulated output voltage is then equal to approximately VOUT=VREF/K, where K is the programmable attenuation factor. An active MOSFET device 276 is added to the pull-up MOSFET 270. The active device, the n-channel MOSFET HSENSE 276, has its MOSFET gate in parallel with the n-channel MOSFET gate of HS 270. The n-channel MOSFET HS 270 has a MOSFET finger ratio of N fingers of MOSFET HS 270 to 1 finger of MOSFET HSENSE 276. The n-channel MOSFET HSENSE 276 gate is coupled to the LS MOSFET 280. In this embodiment, and essential feature is that the n-channel MOSFET HSENSE 276 is matched to the n-channel MOSFET HS 270. An n-channel MOSFET circuit with n-channel MOSFET 282 and 283 are electrically coupled to MOSFET HS 270, and MOSFET HSENSE 276, respectively. The n-channel MOSFET 282 and 283 form a current mirror sourcing the MOSFET HSENSE 276 and MOSFET HS devices 270. With the insertion of the cascode circuit, the cascode addition is regulation the source of the MOSFET HSENSE 276 to the same potential as the MOSFET HS device 270 source. As a result, which is confirmed by simulation, the HS/HSENSE configuration is matched and balanced electrically providing an improvement in the power supply rejection ratio (PSRR), in the example of the implementation of FIG. 4. In this case, the power supply rejection ratio (PSRR) is increased by 20 dB under a load condition of 100 mA. The addition of the cascode devices do not add complexity to the implementation, and does not significantly impact the silicon area of the embodiment.

Figure 8:
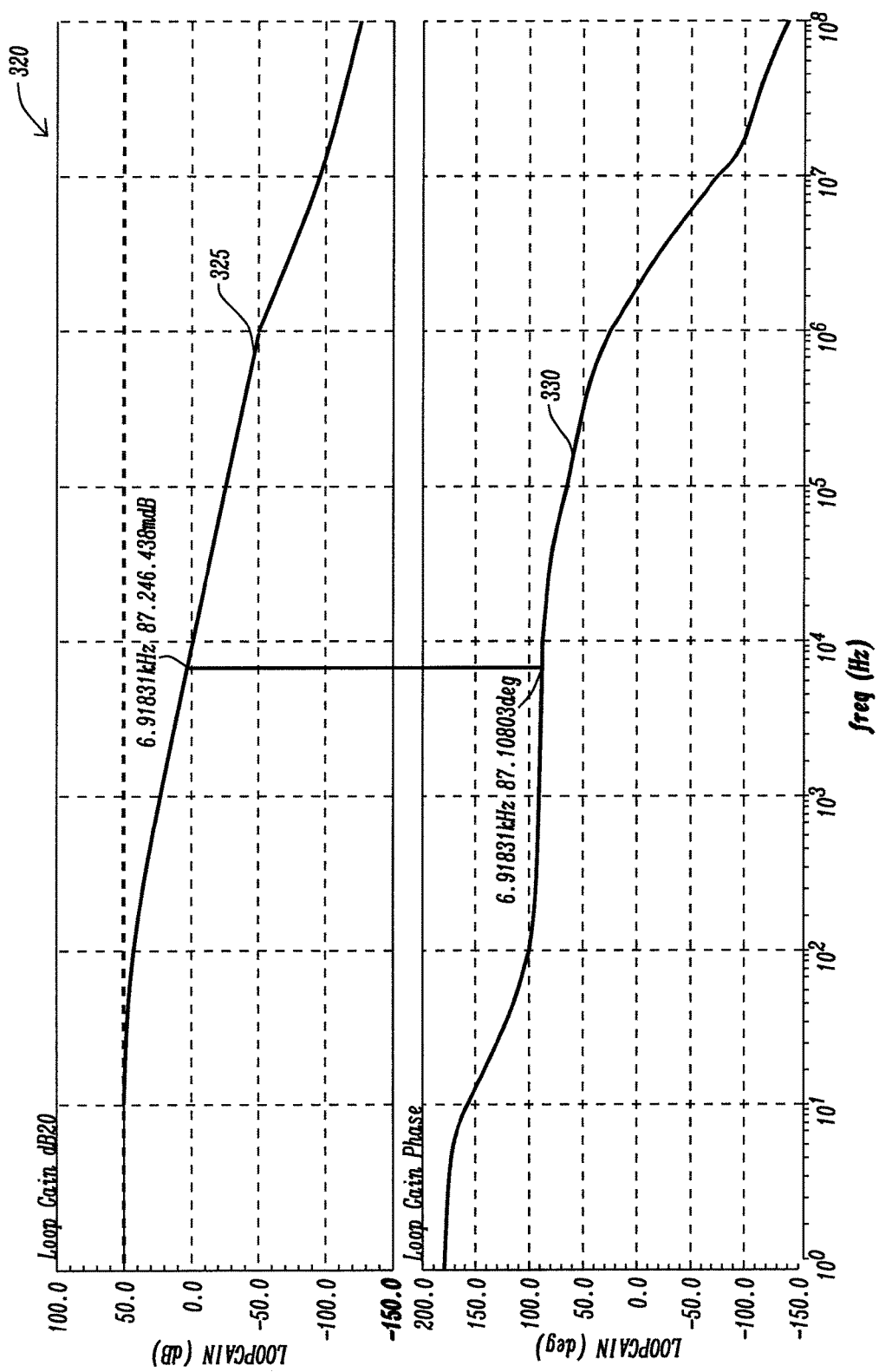
FIG. 8 is a LDO Bode plot highlight the gain as a function of frequency for a 1 mA load in accordance with an embodiment of the disclosure.

FIG. 8 is a LDO Bode plot highlight the gain as a function of frequency for a 1 mA load in accordance with an embodiment of the disclosure. The Bode plot 320 contains Loop Gain 325 and Loop Gain Phase 330. This plot shows that the implementation of the LDO can be stable for a 1 mA of load current even with an 1 uH inductor in series with the supply.

Figure 9:
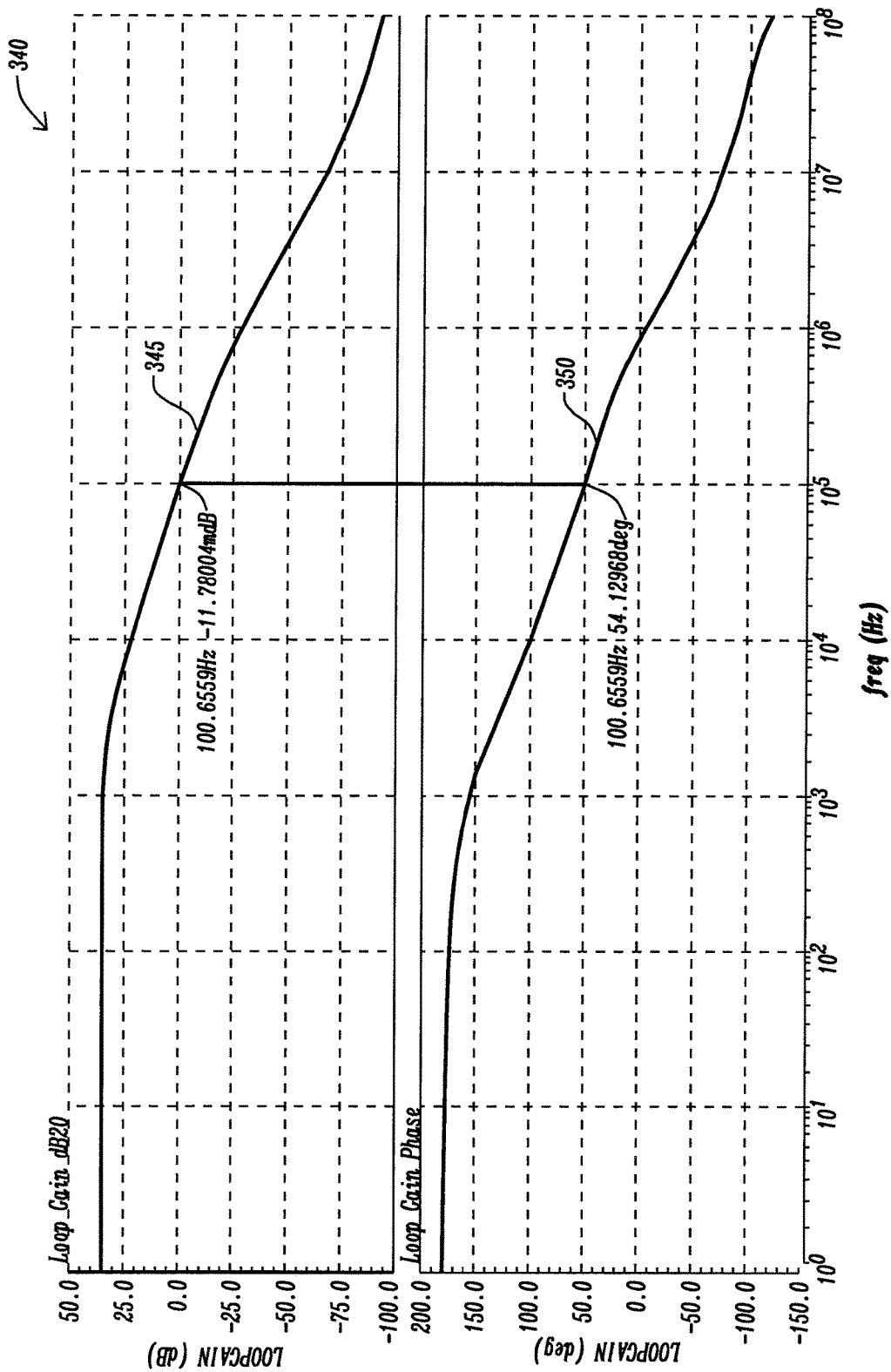
FIG. 9 is a LDO Bode plot highlight the gain as a function of frequency for a 100 mA load in accordance with an embodiment of the disclosure.

FIG. 9 is a LDO Bode plot highlight the gain as a function of frequency for a 100 mA load in accordance with an embodiment of the disclosure. The Bode plot 340 contains Loop Gain 345 and Loop Gain Phase 350. This plot shows that the implementation of the LDO can be stable for a 100 mA of load current even with an 1 uH inductor in series with the supply.

Figure 10:
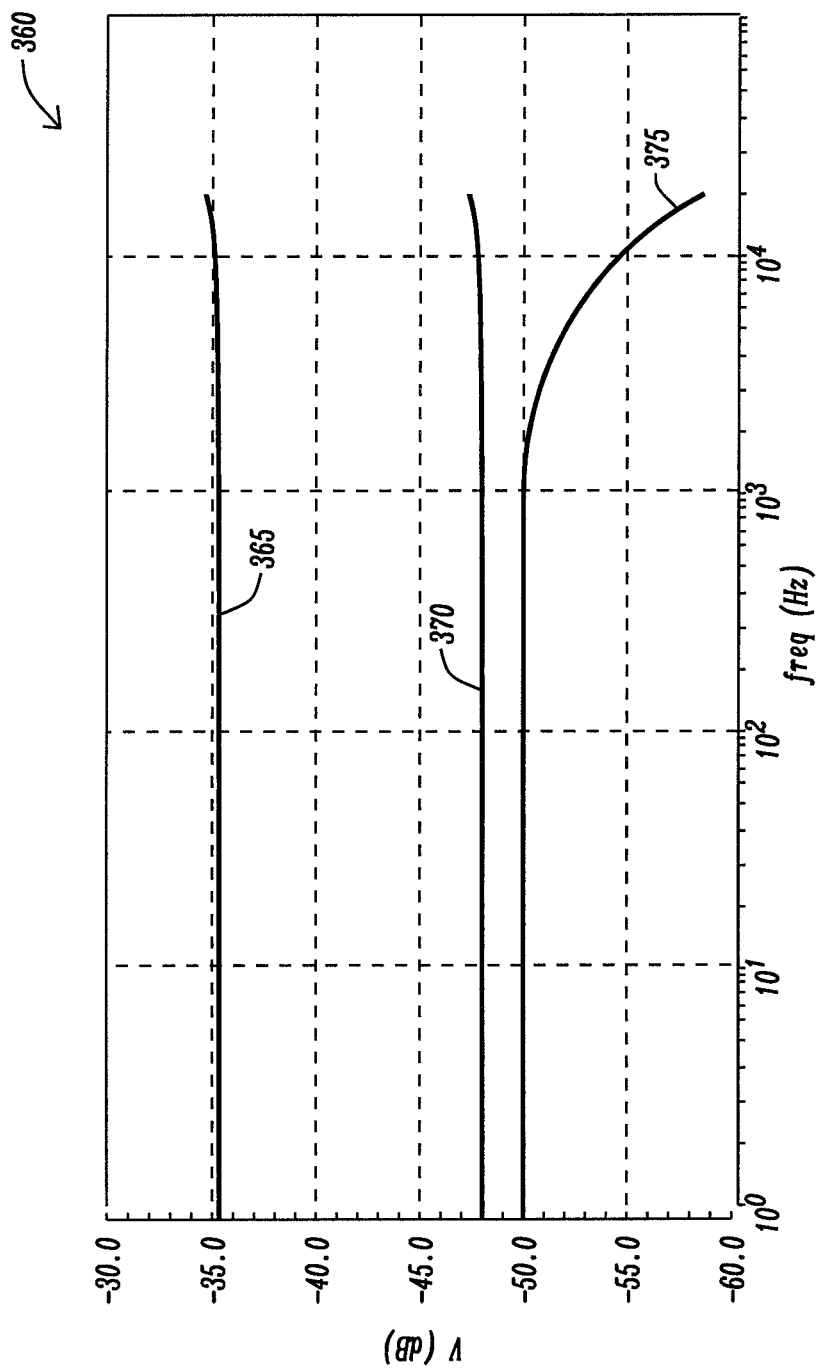
FIG. 10 is a plot of the power supply rejection ratio (PSRR) frequency response of the low dropout (LDO) in accordance with an embodiment of the disclosure; and, FIG. 11 is a methodology for providing improved operation of a low dropout (LDO) in linear mode of operation.

FIG. 10 is a plot of the power supply rejection ratio (PSRR) frequency response 360 of the low dropout (LDO) in accordance with an embodiment of the disclosure. One of the major benefits of having an LDO is the power supply rejection ratio (PSRR). TDMA envelope carried by a battery has a low frequency component that is within the audio band. It is important that the cumulated PSRR from the LDO and audio amplifier is sufficient to suppress any noise from the battery over the audio band from 20 Hz to 20 kHz. FIG. 10 shows the PSRR as a function of frequency for 100 mA load 365, 10 mA load 370, and 1 mA load (375). The results show that the PSRR is frequency independent below 2 kHz.

Figure 11:
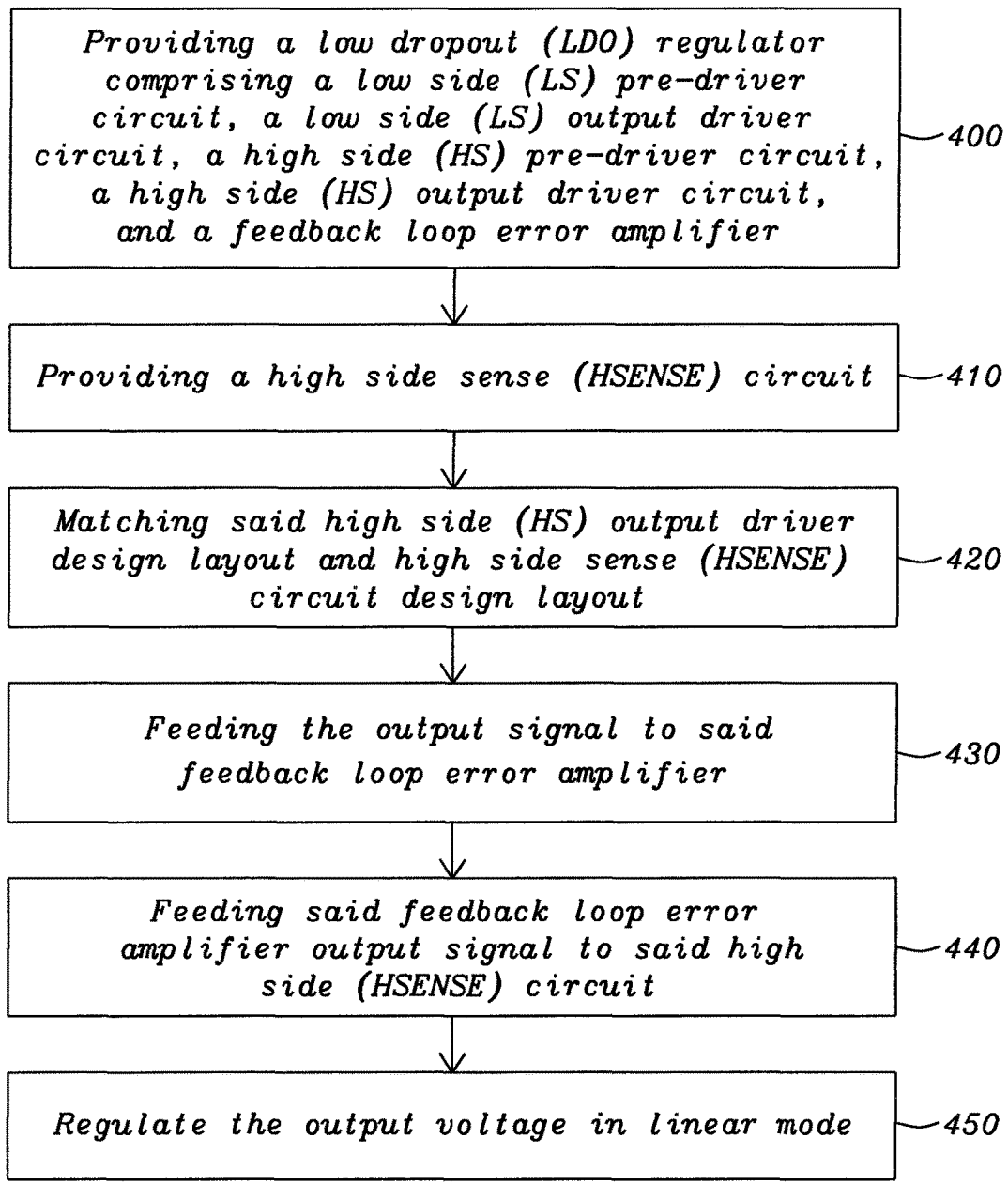

FIG. 11 is a methodology for providing improved operation of a low dropout (LDO) in linear mode of operation in accordance with the embodiment of this disclosure. A method of an improved linearity comprising the steps of (1) providing a low dropout (LDO) regulator comprising a low side (LS) pre-driver circuit, a low side (LS) output driver circuit, a high side (HS) pre-driver circuit, a high side (HS) output driver circuit, and a feedback loop error amplifier 400, (2) providing a high side sense (HSENSE) circuit 410, (3) matching a high side (HS) output driver circuit design layout and a high side sense (HSENSE) circuit design layout 420, (4) feeding an output signal to a feedback loop error amplifier 430, (5) feeding a feedback loop error amplifier output signal to a high side sense (HSENSE) circuit 440, (6) and regulate the output voltage in linear mode 450.

As such, a novel low dropout (LDO) regulator with improved regulation in the LDO linear mode of operation are herein described. The improvement is achieved with minimal impact on silicon area or power usage. The improved low dropout (LDO) circuit reduces silicon chip area, improved PSRR, and good linear mode characteristics. Other advantages will be recognized by those of ordinary skill in the art.

The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A low dropout (LDO) device with both low drop-out (LDQ) and boost operation having improved linear mode operation, the device comprising:
   a circuit providing low-drop-out (LDO) and boost operation having improved linear operation comprising:
   an inductor, wherein the inductor is deployed between an input of the circuit and a midpoint (LX) between a low side (LS) MOSFET element and a high side (HS) MOSFET element:
   an error amplifier;
   a programmable attenuation factor circuit coupled to said error amplifier;
   a feedback network whose input is electrically connected to said programmable attenuation factor circuit and whose output is electrically coupled to the negative input of said error amplifier;
   said low side (LS) MOSFET element whose input is said error amplifier;
   a high side sense (HSENSE) MOSFET element whose gate is electrically coupled to said low side (LS) MOSFET element, wherein the high side sense (HSENSE) MOSFET element has a multiplicity of fingers, a ratio of a number of fingers of the high side sense (HSENSE) MOSFET element to a number of fingers of the high side (HS) MOSFET element is 1:N, wherein N is a natural number higher than 1;
   said high side (HS) MOSFET element, which is a MOSFET element having a multiplicity of fingers, wherein a gate of the high side (HS) MOSFET element is deployed in parallel with the gate of the high side sense (HSENSE) MOSFET element, wherein said high side sense (HSENSE) MOSFET element is matched to said high side (HS) MOSFET element by insertion of said high side sense (HSENSE) MOSFET element spatially within said high side (HS) element wherein the high side sense (HSENSE) MOSFET element and the high side (HS) MOSFET element are sharing the same well, which improves matching by reducing the space between both output stage elements.

2. The low dropout (LDO) device of claim 1 wherein said low side (LS) MOSFET element, said high side sense (HSENSE) MOSFET element, and high side (HS) MOSFET element are n-channel MOSFETs.

3. The low dropout (LDO) device of claim 1 wherein said high side sense (HSENSE) MOSFET element is matched to said high side (HS) MOSFET element by minimizing the nested-to-isolated linewidth variation and interdigitating of said high side sense (HSENSE) MOSFET element spatially within said high side (HS) MOSFET element.

4. The low dropout (LDO) device of claim 1 wherein said high side sense (HSENSE) MOSFET element is matched to said high side (HS) MOSFET element by identical layout design of MOSFET fingers.

5. A low dropout (LDO) device with both low drop-out (LDO) and boost operation having improved linear mode operation, the device comprising:
   a circuit providing low-drop-out (LDO) and boost operation having improved linear operation comprising:
   an inductor, wherein the inductor is deployed between an input of the circuit and a midpoint (LX) connected to both a high side sense (HS) MOSFET element and a high side (HS) MOSFET element;
   an error amplifier configured to amplify a voltage difference between a reference voltage and a feedback voltage from a feedback network, wherein an output of the error amplifier is connected to a gate of a first low side (LS) MOSFET element;
   a programmable attenuation factor circuit coupled to said error amplifier;
   said feedback network whose input is electrically connected to said programmable attenuation factor circuit and whose output is electrically coupled to a negative input of said error amplifier;
   said first low side (LS) MOSFET element whose input is the output of said error amplifier;
   a second low side (LS) MOSFET element whose gate is electrically connected to the gate of said first low side (LS) MOSFET element;
   a current mirror network, wherein a first transistor of the current mirror network is electrically coupled to said first low side (LS) MOSFET element and a second transistor of the current mirror network is connected to said second low side (LS) MOSFET element and wherein a cascode addition of said current mirror network is configured to regulate a source of a high side sense (HSENSE) MOSFET element to a same potential as a source of a high side (HS) MOSFET element;
   said high side sense (HSENSE) MOSFET element whose gate is electrically coupled to said first low side (LS) MOSFET and whose source is electrically coupled to the first transistor of said current mirror network, wherein the gate of the high side sense (HSENSE) MOSFET element is deployed in parallel with a gate of the high side (HS) MOSFET element; and
   said high side (HS) MOSFET element whose gate and well are electrically coupled to said high side sense (HSENSE) MOSFET element and whose well and source are electrically coupled to said current mirror network and wherein the high side sense (HSENSE) MOSFET element and the high side (HS) element are sharing the same well, wherein the high side (HS) MOSFET element is matched to the high side sense (HSENSE) MOSFET element wherein the sharing of the same well improves said matching by reducing the space between both output stage elements.

6. The low dropout (LDO) device of claim 5 wherein said MOSFET elements are n-channel MOSFETs.

* * * * *